(12) United States Patent
Gregory et al.

(10) Patent No.: US 7,227,858 B1
(45) Date of Patent: Jun. 5, 2007

(54) METHOD OF SYNCHRONIZATION WITHOUT BROADCASTING SYNCHRONIZATION SIGNAL

(75) Inventors: Machon B Gregory, Bowie, MD (US); Angela M Schuett, Columbia, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 232 days.

(21) Appl. No.: 11/110,997

(22) Filed: Apr. 7, 2005

(51) Int. Cl.
*H04J 3/06* (2006.01)

(52) U.S. Cl. .................. 370/350; 370/503; 370/516; 455/502

(58) Field of Classification Search ............ 455/456.1, 455/502, 524; 370/350, 507, 515, 516, 503; 375/356, 358
See application file for complete search history.

(56) References Cited

U.S. PATENT DOCUMENTS

| | | | | |
|---|---|---|---|---|
| 4,914,444 A | * | 4/1990 | Pifer et al. ................. | 342/460 |
| 5,579,513 A | * | 11/1996 | Strohmer .................... | 713/600 |
| 5,867,489 A | * | 2/1999 | Hershey et al. ............. | 370/324 |
| 6,373,834 B1 | * | 4/2002 | Lundh et al. ................ | 370/350 |
| 6,665,541 B1 | | 12/2003 | Krasner et al. | |
| 6,813,324 B1 | | 11/2004 | Yewen | |
| 6,836,851 B2 | | 12/2004 | Dive | |
| 2004/0223515 A1 | * | 11/2004 | Rygielski et al. ........... | 370/503 |

* cited by examiner

*Primary Examiner*—Sanh D. Phu
(74) *Attorney, Agent, or Firm*—Robert D. Morelli

(57) ABSTRACT

A method of synchronizing stations without broadcasting a synchronization signal. Presetting an environmental variable into each station prior to deploying the stations. Presetting an interval of time into each station prior to deployment. Deploying the stations. Waiting the interval of time. Measuring the environmental variable at each station. Returning to the fourth step if the measurement is not within a first user-definable range. Returning to the fifth step if the measurement is not within a second user-definable range. Synchronizing a clock within the station to the time that a synchronization event is measured, and returning to the fourth step.

6 Claims, 1 Drawing Sheet

METHOD OF SYNCHRONIZATION WITHOUT BROADCASTING SYNCHRONIZATION SIGNAL

FIELD OF INVENTION

The present invention relates, in general, to pulse or digital communication and, in particular, to network synchronizing more than two stations.

BACKGROUND OF THE INVENTION

Synchronization of individual stations within a distributed network is an important issue for the wireless networking community. Synchronization is where individual stations within a network share the same concept of time. Synchronization is important in applications such as time-stamping and coordinating activities. Typically, the time kept by one station is broadcast to the other stations. Such broadcasts expend energy and make the network prone to error and susceptible to manipulation by unauthorized persons. Furthermore, clocks are imperfect and transmission delays only add to the problem. Therefore, there is a need for a method of synchronization that does not require broadcasts.

U.S. Pat. No. 6,665,541, entitled "METHODS AND APPARATUSES FOR USING MOBILE GPS RECEIVERS TO SYNCHRONIZE BASESTATIONS IN CELLULAR NETWORKS," discloses a device for and method of synchronization that relies on broadcasts from the Global Positioning System (GPS). The present invention does not require a broadcast from the GPS for synchronization as does U.S. Pat. No. 6,665,541. U.S. Pat. No. 6,665,541 is hereby incorporated by reference into the specification of the present invention.

U.S. Pat. No. 6,813,324, entitled "SYNCHRONIZED COMMUNICATION SYSTEM," discloses a device that includes a transmitter for transmitting a low frequency synchronization signal. The present invention does not transmit a low frequency signal to achieve synchronization as does U.S. Pat. No. 6,813,324. U.S. Pat. No. 6,813,324 is hereby incorporated by reference into the specification of the present invention.

U.S. Pat. No. 6,836,851, entitled "TWO-STEP SYNCHRONIZATION METHOD IN WHICH TWO MODULES ARE SYNCHRONIZED FIRST BY FREQUENCY FOLLOWED BY A SYNCHRONIZATION IN PHASE," discloses a method of synchronization that requires two transmissions, one from a first station to a second station of the first station's clock signal, and one from the second station to the first station of its clock signal which was generated using the clock signal received from the first station. The present invention does not require two transmissions between two stations as does U.S. Pat. No. 6,836,851. U.S. Pat. No. 6,836,851 is hereby incorporated by reference into the specification of the present invention.

SUMMARY OF THE INVENTION

It is an object of the present invention to synchronize a plurality of stations without broadcasting a synchronization signal between the stations.

It is another object of the present invention to synchronize a plurality of stations using a least one environmental variable.

The present invention is a method of synchronizing stations using at least one environmental variable in a manner that does not require the broadcast of a synchronization signal.

The first step of the method is presetting an environmental variable into each station prior to deploying the stations.

The second step of the method is presetting an interval of time for each of the stations prior to deployment.

The third step of the method is deploying the stations.

The fourth step of the method is waiting the interval of time at each station.

The fifth step of the method is measuring the environmental variable at each station.

The sixth step of the method is returning to the fourth step if the measurement is not within a first user-definable range (i.e., the range in which it is possible for a synchronization event to occur).

The seventh step of the method is resetting the interval of time to an interval of time that is less than the interval of time by a user-definable amount and returning to the fourth step if the measurement is not within a second user-definable range (i.e., the range in which it is not imminent that a synchronization event will occur).

The eighth, and last, step of the method is synchronizing a clock within each station to the time of the measurement at which a synchronization event occurred, and returning to the fourth step for subsequent re-synchronization.

DETAILED DESCRIPTION

Figure 1:
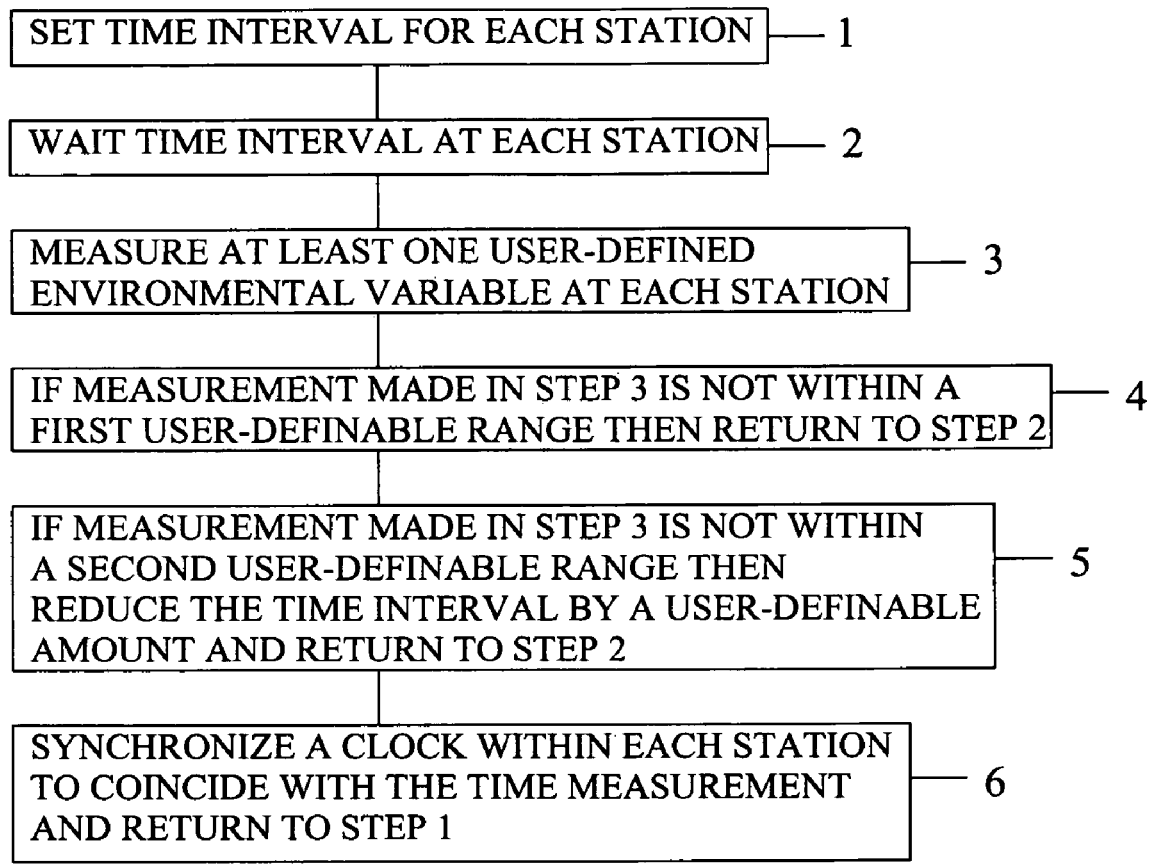
FIG. 1 is a flowchart of the steps of the present invention.

The present invention is a method of synchronizing stations using at least one environmental variable in a manner that does not require the broadcast of a synchronization signal.

FIG. 1 is a flowchart of the method of the present invention.

The first step 1 of the method is presetting at least one user-definable environmental variable for each of the plurality of stations prior to deploying the stations. In the preferred embodiment, the environmental variables include temperature (air, ground, or any other natural entity), light (daylight, lightning, or any other naturally occurring light source), humidity (air, ground, or any other naturally occurring source of humidity), and sound.

The second step 2 of the method is presetting a interval of time for each of the plurality of stations prior to deploying the stations. The interval of time is chosen in light of the at least one user-definable environmental variable preset in the first step 1. The time interval is changeable by the stations after deployment without communication between the stations. The second step 2 sets an interval of time for checking whether a synchronization event has occurred. The present method is idle and conserves energy between intervals of time. The initial interval of time is for checking the environmental variable in the range of when the synchronization event (e.g., daylight) is not imminent of occurring. The interval of time is re-set (i.e., shortened) in a later step below for two other intervals—when the environmental variable just enters the range of when the synchronization event is imminent of occurring (i.e., is possible of occurring) and when the environmental variable is near the end of the range when the synchronization event is imminent of occurring (i.e., is likely of occurring). For each interval (i.e., not imminent of occurring, possible of occurring, and likely to occur), the time interval follows the Nyquist sampling rate (i.e., is at least twice the frequency of the interval in question). Empirical data should be obtained for each environmental variable used in the present invention to determine the sampling rate for each interval.

The third step 3 of the method is deploying the stations.

The fourth step 4 of the method is waiting the interval of time set in the second step 2, or reset in a subsequent step, at each of the stations.

The fifth step 5 of the method is measuring the at least one user-definable environmental variable preset in the first step 1 at each of the stations.

The sixth step 6 of the method is returning to the fourth step 4 if the measurement made in the fifth step 5 is not within a first user-definable range. The first user-definable range is the range in which the environmental variable selected is possible of occurring. In other words, the sixth step 6 says to use the interval of time set in the second step 2, or subsequently reset, for the next waiting period, which is the interval for when the environmental variable is not imminent of causing a synchronization event.

The seventh step 7 of the method is resetting the interval of time preset in the second step 2, or subsequently reset in the seventh step 7, to an interval of time that is less than the interval of time by a user-definable amount and returning to the fourth step 4 if the measurement is not within a second user-definable range. The second user-definable range is the range in which the environmental variable is not imminent of causing a synchronization event. The seventh step 7 is only performed when the environmental variable is not in the "not imminent of occurring" range. This means that the environmental variable is either in the "possible to occur" ranges or the "likely to occur" range. Therefore, the time interval should be shortened a user-definable amount. That amount should be in accordance with the Nyquist sampling rate for the frequency of occurrence of the environmental variable in the "possible to occur" range. As the environmental variable gets closer and closer to the "likely to occur" range, the time interval will get shorter and shorter until the time interval is almost zero, which means that the environmental variable is monitored constantly for the occurrence of the synchronization event (e.g., lighting striking). This is done to avoid the possibility of missing the synchronization event. When the synchronization event is less likely to occur, the present method samples the variable less frequently, but as the synchronization event becomes more likely, it is sampled more frequently.

The eighth, and last, step 8 of the method is synchronizing a clock within each of the stations to coincide with the time of the measurement of a synchronization event, and returning to the fourth step 4 for subsequent re-synchronization.

What is claimed is:

1. A method of synchronizing a plurality of stations without broadcasting a synchronization signal between the plurality of stations, comprising the steps of
   a) presetting at least one user-definable environmental variable of monitoring a synchronization event for each of the plurality of stations prior to deployment of the stations;
   b) presetting an interval of time for each of the plurality of stations prior to deployment of the stations, where the interval of time is chosen in light of the at least one user-definable environmental variable preset in step (a), and where the time interval is changeable by any of the stations after deployment without communication with any other station;
   c) deploying the plurality of stations;
   d) waiting the interval of time at each of the plurality of stations;
   e) measuring the at least one user-definable environmental variable at each of the plurality of stations;
   f) if the measurement made in step (e) is not within a first user-definable range then returning to step (d);
   g) if the measurement made in step (e) is not within a second user-definable range then resetting the interval of time to an interval of time that is less than the interval of time by a user-definable amount and returning to step (d); and
   h) synchronizing a clock within each of said plurality of stations to coincide with the time of the measurement of the synchronization event, and returning to step (d).

2. The method of claim 1, wherein said step of presetting an interval of time for each of the plurality of stations prior to deployment of the stations is comprised of the step of setting an interval of time for each of the plurality of stations based on a Nyquist sampling rate and empirical data for when synchronization is not imminent of occurring.

3. The method of claim 2, wherein said step of measuring the at least one user-definable environmental variable at each of the plurality of stations is comprised of the step of measuring the at least one user-definable environmental variable at each of the plurality of stations selected from the group of environmental variable consisting of temperature, light, humidity, and sound.

4. The method of claim 3, wherein said step of if the measurement made in step (e) is not within a second user-definable range then resetting the interval of time to an interval of time that is less than the interval of time by a user-definable amount and returning to step (d) is comprised of the step of if the measurement made in step (e) is not within a second user-definable range then resetting the interval of time to an interval of time that is less than the interval of time by an amount based on a Nyquist sampling rate and empirical data for when synchronization is imminent of occurring and returning to step (d).

5. The method of claim 1, wherein said step of measuring the at least one user-definable environmental variable at each of the plurality of stations is comprised of the step of measuring the at least one user-definable environmental variable at each of the plurality of stations selected from the group of environmental variable consisting of temperature, light, humidity, and sound.

6. The method of claim 1, wherein said step of if the measurement made in step (e) is not within a second user-definable range then resetting the interval of time to an interval of time that is less than the interval of time by a user-definable amount and returning to step (d) is comprised of the step of if the measurement made in step (e) is not within a second user-definable range then resetting the interval of time to an interval of time that is less than the interval of time by an amount based on a Nyquist sampling rate and empirical data for when synchronization is imminent of occurring and returning to step (d).

* * * * *